United States Patent [19]

Geisthoff

[11] 4,236,388
[45] Dec. 2, 1980

[54] SEPARABLE THREE-SECTION TELESCOPIC DRIVE SHAFT

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 5,701

[22] Filed: Jan. 23, 1979

[30] Foreign Application Priority Data

Jan. 28, 1978 [DE] Fed. Rep. of Germany ....... 2803822

[51] Int. Cl.³ .......................... E21B 17/07; F16D 3/06
[52] U.S. Cl. ............................................ 64/23; 64/4; 64/9 A
[58] Field of Search ................................ 64/23, 4, 9 A

[56] References Cited

U.S. PATENT DOCUMENTS

| | | | |
|---|---|---|---|
| 3,344,618 | 10/1967 | Young | 64/4 |
| 3,543,536 | 12/1970 | Rekow | 64/23 |
| 3,618,340 | 11/1971 | Geisthoff et al. | 64/23 |
| 4,107,949 | 8/1978 | Wanner et al. | 64/9 A |
| 4,136,533 | 1/1979 | Okuda | 64/23 |
| 4,162,618 | 7/1979 | Okuda | 64/23 |

FOREIGN PATENT DOCUMENTS

| | | | |
|---|---|---|---|
| 1943837 | 3/1971 | Fed. Rep. of Germany | 64/23 |
| 2510062 | 10/1976 | Fed. Rep. of Germany | 64/23 |

Primary Examiner—Henry K. Artis
Attorney, Agent, or Firm—Toren, McGeady and Stanger

[57] ABSTRACT

In a separable three-section telescopic drive shaft, such as used for driving an agricultural implement, the shaft consists of an inner section, and a tubular outer section with a tubular intermediate section located between them in the retracted position of the shaft. A locking ball is radially movably supported within a cut-out in the intermediate section and is engageable in a recess in one of the inner and outer sections in the retracted position of the shaft and in a recess in the other of the inner and outer sections in the extended position of the shaft. A cover is attached to one end of the intermediate member and a control disc is slidably positioned within the intermediate member. A spring extends between the cover and the control disc and biases the disc against the adjacent end of the inner section for axially clamping the inner and intermediate sections together when the locking ball is seated within the recess in the inner section.

5 Claims, 5 Drawing Figures

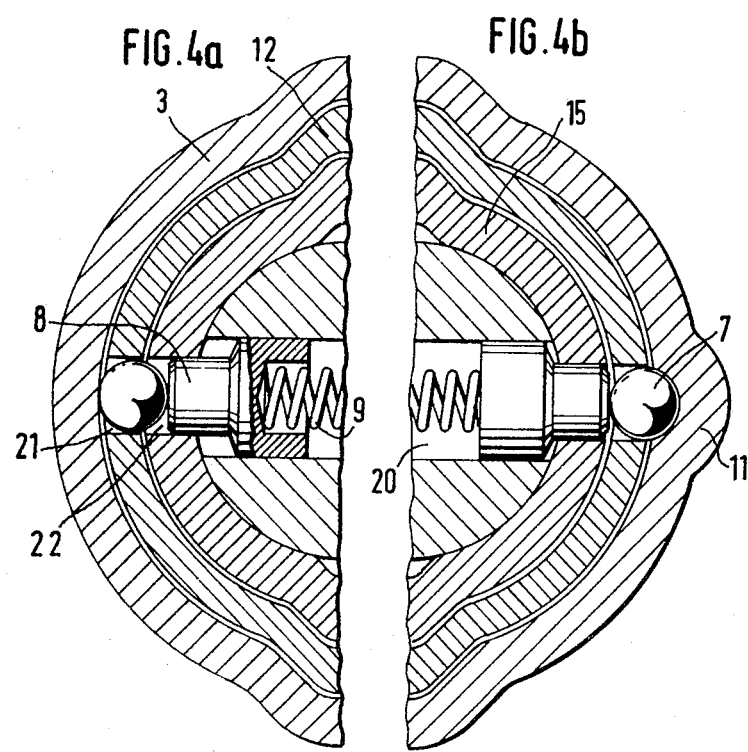

SEPARABLE THREE-SECTION TELESCOPIC DRIVE SHAFT

SUMMARY OF THE INVENTION

The present invention is directed to a separable three-section telescopic drive shaft, particularly for driving agricultural implements, and consists of three sections which fit one into the other with little play. The outer ones of the sections are tubular in form. The axial movement of the intermediate section is limited relative to the other sections.

There is a known telescopically extendable arm which is used in nuclear power plants and is preferably arranged vertically. The arm consists of three or more tubes which fit one into the other and the maximum length of extension of the tubes is limited by rigid stops, note German Offenlegungsschrift No. 2,510,062. In the illustrated embodiment of the arm, a locking body, such as a ball, is located in a continuous bore extending through an intermediate tube and a ring surrounding the upper end of the tube. In the retracted position, the ball, which is held in a cut-out in the intermediate tube, interacts with a spherical segment placed on the inner tube, that is, in a ring surrounding the cut-out, and the ball restricts the movement of the inner tube relative to the intermediate tube. As a result, the movement of both of these tubes conform when the arm is extended. The locking action between the two tubes, however, is overcome when the ring surrounding the upper portion of the intermediate tube contacts a stop arranged on the other tube. Another bore is provided in the outer tube and aligned with the cut-out in the intermediate tube for receiving the locking ball.

As a result of the interaction of the stops on the outer tube in the intermediate tube, only one movement of the inner tube can take place in this position. Due to an outwardly directed force acting on the inner tube, an outwardly directed force component operates on the ball functioning as the locking body. As a result, the ball is partially displaced into the bore in the outer tube. A locking body is axially movable in the intermediate tube and it falls, under the influence of gravity, when the inner tube is extended, in front of the cut-out in the intermediate tube and closes the cut-out toward the inside. Accordingly, the outer tube and intermediate tube are locked relative to one another against axial movement.

A telescopic arrangement of the above type is not suited for use in universal joint drive shafts of agricultural machines. The displacement of the locking ball determining the sequence of movements is achieved by force components directed inwardly or outwardly. These force components act in a controlled manner as a result of the interaction of stops arranged between the individual tubes. Such stops, however, do not prevent a complete extension of the universal joint drive shaft as is required in agricultural usage for the prevention of accidents. When the agricultural implement is uncoupled from a tractor, it often happens that inadvertently the universal joint shaft is not separated at the tractor or the implement. When the tractor is subsequently started up, the implement is turned over when the universal joint shaft is not extended and such action may lead to operator accidents and may also damage the implement.

Furthermore, a three-section telescopic shaft arranged to prevent accidents has been suggested in which the outer and intermediate sections are axially movable together and each is provided with an eccentrically arranged rod. Each of the rods has an end stop at its free end. The rods pass through plates or plugs arranged in the interior of the intermediate section and of the inner section and prevent an extension of the telescopic shaft by means of stops, note German Offenlegungsschrift No. 1,943,837. Such a universal joint shaft has the disadvantage that in the axial direction the rods arranged in its interior are not located next to one another and, accordingly, imbalances occur at higher rates of rotation. Moreover, such a universal joint shaft is relatively heavy which impairs the maneuverability required in agricultural operations.

The above-described shaft has the additional disadvantage that it cannot be completely separated.

The primary object of the present invention is to provide a three-section universal joint drive shaft for agricultural machines which can transmit the necessary torque for driving the machines and which can be completely separated while preventing any of the separated components from being lost. The changeover in the locked engagement of the individual sections can be guaranteed even in the case of sudden changes in length which occur while torque is being transmitted by the shaft. Moreover, the universal joint drive shaft can be equipped with an accident preventing device which ensures, in accordance with the applicable regulations, a complete cover of the rotating universal drive shaft in all of its extended positions.

In accordance with the present invention, as is known, at least one locking ball is radially movably supported in a cut-out provided adjacent one end of the intermediate section of the telescopic shaft with the locking ball serving alternately to lock the axial movement of the intermediate section relative to the inner or outer section. The diameter of the locking ball is larger than the wall thickness of the intermediate section and each of the inner section and outer section is provided with a recess located on the axial path of travel of the locking ball so that the ball can seat in the recess. The depth of the recess is less than the radius of the locking ball. When the intermediate section and the inner section are interlocked, a spring acts between the two members so that they are held together in a clamped state. In the initial movement of the three-section telescopic drive shaft, that is movement from the retracted to the extended position, the inner section and intermediate section move together since they are interlocked. As a result of the axial force acting between the inner section and the intermediate section during this part of the extension movement, an outwardly directed force component acts radially on the locking ball. The magnitude of the force component can be determined by the depth of the recess in the inner section, that is, the magnitude of the radially directed component increases with the decreasing depth of the recess. Accordingly, the force for effecting the disengagement of the locking action can be adjusted within wide limits to practical requirements.

Because of this arrangement, stops which would prevent complete separation of the universal joint shaft are unnecessary. When the interengagement of the inner section and the intermediate section is broken, a locking action takes place between the intermediate section and the outer section and any further extension of the telescopic shaft results in the outwardly directed movement of the inner section. Moreover, if necessary, the inner section can be completely removed from the intermediate section.

Another feature of the invention involves the use of a cover for the end of the intermediate section at which the locking ball or balls are located. The intermediate section is tubular. A control disc is axially movable within the intermediate section and is guided by the cover at the end of the section and a spring is arranged between the cover and the control disc.

As a result of this feature, the force provided by the spring is transmitted through the control disc into the inner section and provides a clamping action between the inner section and intermediate section. When the locking engagement of the inner section and the intermediate section is removed, the control disc is biased outwardly by the spring and is displaced into the path of the cut-out in the intermediate section preventing the ball from falling out of the cut-out. The length of the support for the control disc in the cover is adjustable so that continued outward movement of the control disc relative to the cover cannot occur. As indicated above, the locking balls located within the cut-outs in the intermediate section are prevented from falling inwardly when the inner section is removed from the intermediate section. Even when the universal drive shaft is completely separated, the locking balls cannot fall out because of the position of the control disc. When the inner section is pushed back into the intermediate section, the control disc is forced against the spring action away from the cut-outs and the inner section again retains the locking balls in position.

In still another embodiment of the invention, the recess in the inner section is opened inwardly so that in the locked position of the inner and intermediate sections, a radially acting force can be exerted on the locking ball by a spring-biased thrust member forced outwardly through the recess against the locking ball.

When very large torques are transmitted through the three-section universal joint drive shaft at the same time that large changes in length occur, as is possible in agricultural operations, it may happen that the friction between the inner section and the intermediate section is larger than the axial directed force between these two sections. In such a case, the radial component caused by the clamping action between the inner section and intermediate section which acts on the locking balls, is not sufficient to carry out the changeover of the locking action. Accordingly, it has proven advantageous to apply an additional independent outwardly directed radial force against the locking ball. The force is directly transmitted to the locking ball through a thrust member from a spring arranged within the inner section and the effect of such force is independent of the magnitude of the torque being transmitted and from the friction conditions between the inner section and the intermediate section.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIGS. 4a and 4b are transverse cross-sectional views of the three-section telescopic shaft shown in FIGS. 2 and 3 with FIG. 4a showing the position according to FIG. 2 and FIG. 4b showing the position according to FIG. 3.

DETAIL DESCRIPTION OF THE INVENTION

Figure 1:
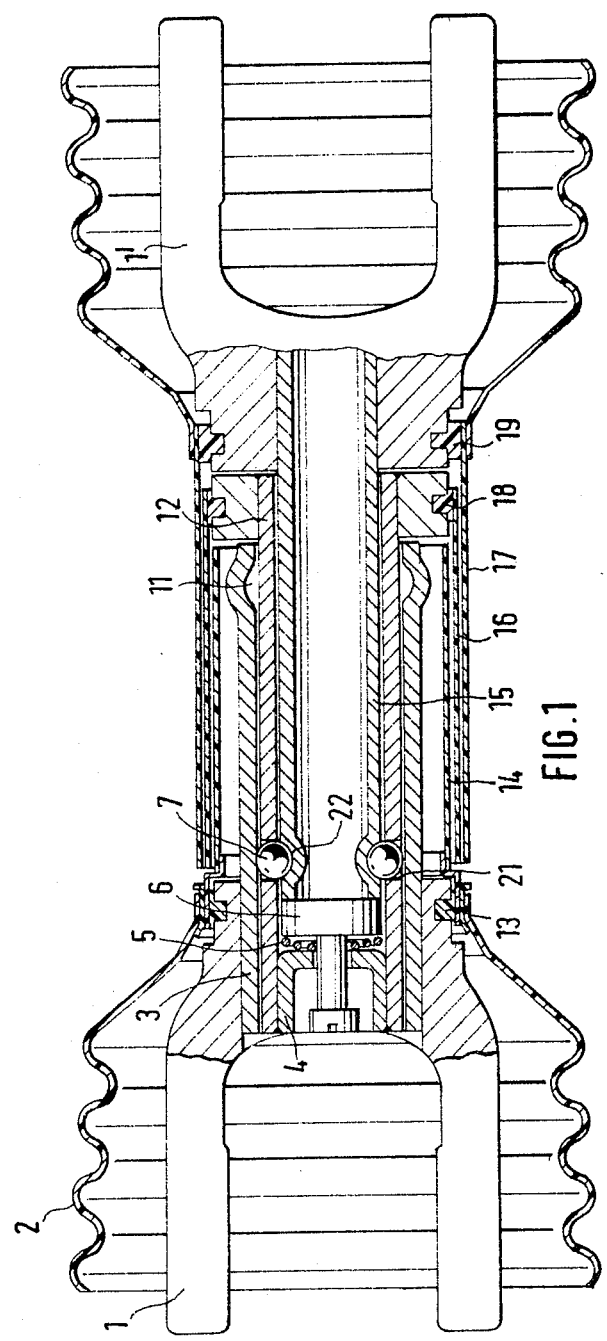
FIG. 1 is an axially extending sectional view through a three-section telescopic drive shaft embodying the present invention with the telescopic shaft arranged in the retracted position.

FIG. 1 illustrates an axial section through a three-section telescopic drive shaft with the shaft in the completely retracted state. The shaft is formed of an outer tubular section 3, an inner tubular section 15 and an intermediate tubular section 12. In the embodiment shown, two oppositely arranged locking balls 7 are positioned in cut-outs 21 in the intermediate section and the balls also engage recesses 22 in in the inner section. While in this embodiment the inner section is tubular it could be a solid member. As a result of the locking ball, the intermediate section is locked in a positive manner to the inner section. A closure cover 4 is provided in the end of the intermediate section 12 and a control disc 6 is positioned within the intermediate section and includes a guide member which extends from the disc through the cover. The guide member is axially slidably guided by the cover 4. Located between the cover 4 and the control disc 6 is a compression spring 5 which acts on the intermediate section 12 through the cover 4 and on the inner section 15 through the control disc 6. The control disc 6 bears against the end of the inner section 15. The spring 5 acting against both of the section members clamps them together. Since the resulting axial force provided by the clamping action acts eccentrically on the locking balls 7, a radially outwardly directed force component operates on the locking balls when the inner section 15 is locked to the intermediate section 12.

When the universal joint drive shaft as shown in FIG. 1 is extended from the fully retracted position, initially, the inner section 15 and the intermediate section 12 move as a unit in the extending direction because they are interlocked. When the locking balls reach the region of the recess 11 in the outer section 3, the axial force acting between the intermediate section 12 and the inner section 15 or its radially acting component acting on the locking balls 7 causes the balls to be displaced radially outwardly from the recesses 22 in the inner section 15 into the recesses 11 in the outer section 3. Accordingly, the locking action between the inner section 15 and the intermediate section 12 is released and a locking action is established between the intermediate section 12 and the outer section 3. In the simplest form, the locking balls 7 could be secured in this position of the universal joint shaft by upsetting the inner edge of the cut-out 21 in the intermediate section 12. A better solution, however, is offered by the action of the compression spring 5 against the control disc 6. If the inner section 15 continues to move in the extending direction, the control disc is no longer held by the adjacent end of the inner section 15 and it moves outwardly guided by the cover 4 with the spring displacing it until the peripheral surface of the control disc 6 is positioned across the inner surface of the cut-outs 21.

If the inner section 15 is now completely removed from the remainder of the telescopic shaft, the locking balls are prevented from falling out of the cut-outs 21, and there are no loose parts involved.

When the three section telescopic shaft is again reassembled, the inner section 15 pushed against the intermediate section 12. As soon as the end of the inner section 15 contacts the control disc 6, the disc, upon further inward movement of the inner section, overcomes the force of the compression spring 5 and is displaced away from the cut-outs 21 where it secures the locking balls 7. When the recesses 22 in the inner section 15 are located opposite the cut-outs 21 in the intermediate section, the locking balls 7 are displaced out of the recesses 11 in the outer section 3 as a result of the inwardly directed radial force component created by the retraction movement and the locking balls are again seated in the recesses 22 in the inner section 15. Accordingly, the locking action between the outer section 3 and the intermediate section 12 is eliminated and the intermediate section 12 is again locked to the inner section 15.

Each of the inwardly facing ends of the yokes 1, 1' have inwardly directed cylindrical projections on which slide bearings 13, 19 are located which support protective tubes 14, 17 and a protective flexible funnel 2 on each of the tubes. An additional protective tube 16 is directly supported on a radially outwardly extending projection on the intermediate section 12 via a bearing 18. The three protective tubes 14, 16 and 17 are arranged so that the entire length of the three section telescopic shaft is covered even in the extended state.

Figure 2:
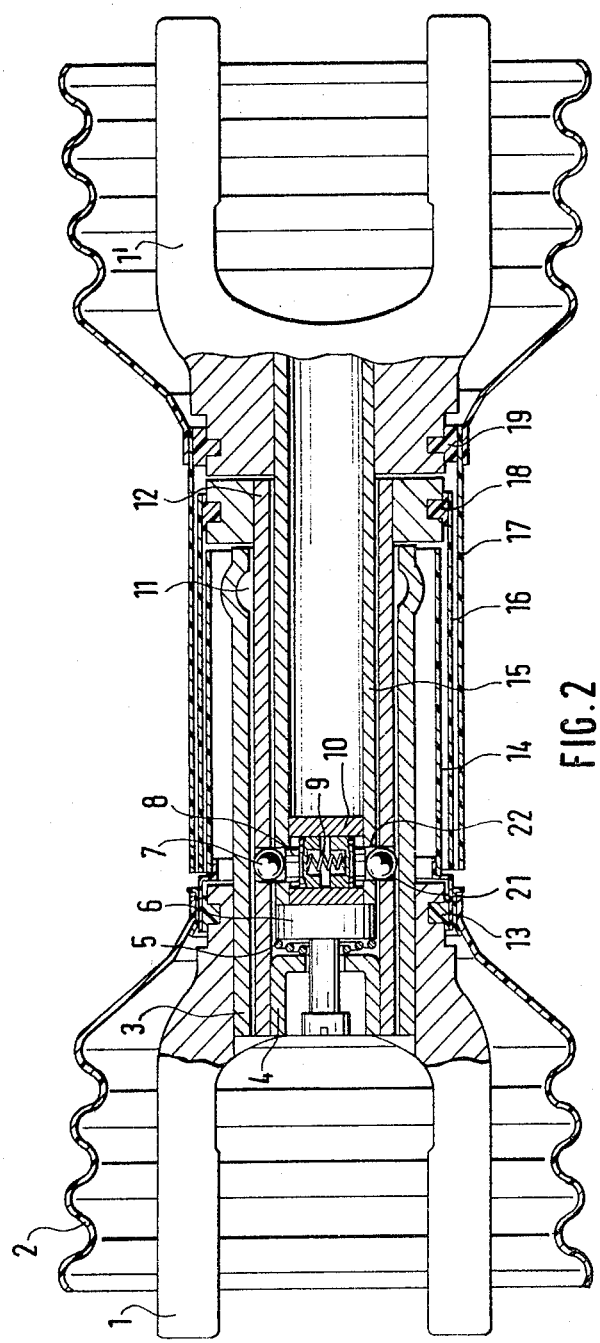
FIG. 2 is an axially extending sectional view of a three-section telescopic shaft in the retracted position, similar to that shown in FIG. 1, with an additional spring positioned within the inner section.

In FIG. 2 an axial section of a three-section telescopic shaft is shown in which the recesses 22 in the inner section 15 open into a cut-out 20, note FIG. 4a, in which another compression spring 9 is located which affords a radially acting force on the locking balls 7 through thrust members 8. As a result of this arrangement, the transition of the locking action between the inner section 15 and the intermediate section 12 to the locking action between the intermediate section 12 and the outer section 3 is ensured even when high friction forces occur as a result of a large torque being transmitted between the inner section 15 and the intermediate section 12. For reasons of simplicity, in FIG. 2, the inner section is illustrated as a tubular member in which an insert 10 is placed for receiving the compression spring 9 and the thrust members 8.

Figure 3:
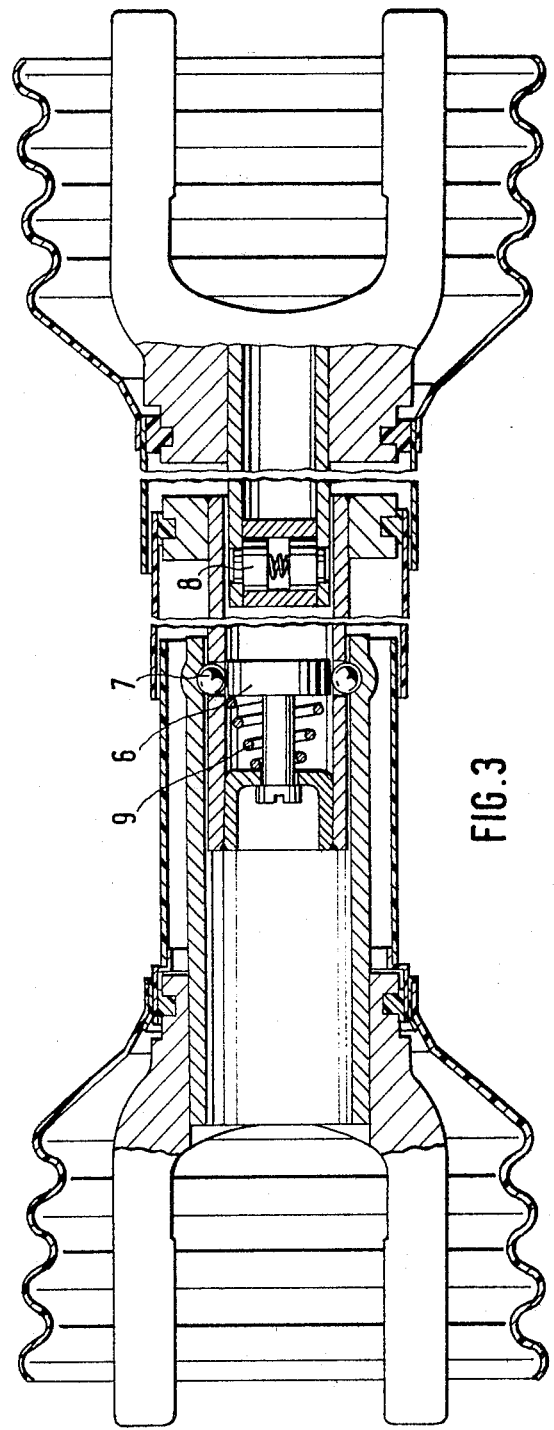
FIG. 3 is a sectional view of the three-section telescopic shaft in FIG. 2 shown in the extended position.

FIG. 3 is an axial section similar to FIG. 2 but with the three-section telescopic shaft illustrated in the extended state in which the intermediate section is locked to the outer section and the locking balls 7 are prevented from being displaced inwardly by the position of the control disc 6.

In FIGS. 4a and 4b two half sections are shown, one of FIG. 2 and the other of FIG. 3. The left-hand half section shows the position of the locking balls when the inner section 15 is locked to the intermediate section 12 and the right-hand section shows the intermediate section 12 locked to the outer section 3.

While the diameter of the locking balls 7 is greater than the wall thickness of the intermediate section 12, the depth of the recesses 11, 22 is less than the radius of the locking balls.

The principle of the reversible locking action for a three-section telescopic shaft described above is not limited to the so-called lemon-shaped section illustrated, rather it can be applied to other types of sections which are suitable for transmitting torque.

While specific embodiments of the invention have been shown and described in detail to illustrate the application of the inventive principles, it will be understood that the invention may be embodied otherwise without departing from its principles.

What is claimed is:

1. Separable three-section telescopic drive shaft for the transmission of torque, such as used for driving agricultural implements, wherein said drive shaft is extendible between a retracted position and an extended position and comprises an axially extending inner section, an outer section laterally enclosing said inner section in the retracted position, and an intermediate section spaced between said inner section and said outer section in the retracted position, at least said outer and intermediate sections being tubular, and means for limiting the axial movement of said intermediate section relative to said inner and outer section, wherein the improvement comprises that said intermediate section has at least one cut-out formed therethrough, said means for limiting axial movement comprises a locking ball radially movably supported is said cut-out, said locking ball having a diameter greater than the wall thickness of said intermediate section, each of said inner section and said outer section having a recess therein located in the path of axial travel of said locking ball as said shaft moves between the retracted and extended positions, the depth of the recesses in said inner and outer sections being less than the radius of said locking ball, said locking ball serving to secure said intermediate section alternately to one of said inner section and outer section, and means for clamping said inner section and intermediate section together when said locking ball is seated in said cut-out and said recess in said inner section.

2. Separable three-section telescopic drive shaft, as set forth in claim 1, wherein said clamping means comprises a spring biasing said inner section in the direction from the retracted position toward the extended position.

3. Separable three-section telescopic drive shaft, as set forth in claim 2, wherein said intermediate section has a first end located in said outer section in the retracted position and extended positions and a second end spaced axially outwardly from said outer section at least in the extended position, a cover closing the first end of said intermediate section, a control disc positioned within said intermediate section, a guide member secured to and extending from said control disc in the axial direction of said intermediate section, said guide member extending through and being axially slidably guided by said cover, and said spring located between and bearing against said control disc and said cover.

4. Separable three-section telescopic drive shaft, as set forth in claim 3, wherein said recess in said inner section comprises an opening extending into said inner section and alignable with said cut-out in said intermediate section, a thrust piece positioned within the opening in said inner section and in axially slidable relation thereto, spring means located within the opening in said inner section inwardly of said thrust piece and disposed in contact with said thrust piece for biasing said thrust piece radially outwardly.

5. Separable three-section telescopic drive shaft, as set forth in claim 3, wherein in the extended position of said shaft, said inner section being capable of displacement axially from said control disc and said control disc then being axially movable within said intermediate section by the action of said spring into the transverse plane containing said cut-out for retaining said locking ball therein and preventing said locking ball from being displaced radially inwardly out of said cut-out.

* * * * *